(12) United States Patent
von Flotow et al.

(10) Patent No.: US 9,359,075 B1
(45) Date of Patent: Jun. 7, 2016

(54) HELICOPTER-MEDIATED SYSTEM AND METHOD FOR LAUNCHING AND RETRIEVING AN AIRCRAFT

(71) Applicant: Hood Technology Corporation, Hood River, OR (US)

(72) Inventors: Andreas H. von Flotow, Hood River, OR (US); Corydon C. Roeseler, Hood River, OR (US); Daniel Reiss, Hood River, OR (US)

(73) Assignee: Hood Technology Corporation, Hood River, OR (US)

(*) Notice: Subject to any disclaimer, the term of this patent is extended or adjusted under 35 U.S.C. 154(b) by 264 days.

(21) Appl. No.: 14/597,933

(22) Filed: Jan. 15, 2015

Related U.S. Application Data

(63) Continuation-in-part of application No. 14/230,454, filed on Mar. 31, 2014.

(60) Provisional application No. 61/808,392, filed on Apr. 4, 2013, provisional application No. 61/807,508, filed on Apr. 2, 2013.

(51) Int. Cl.
  *B64D 5/00* (2006.01)
  *B64D 1/12* (2006.01)
  *B64D 3/00* (2006.01)
  *B64C 39/02* (2006.01)

(52) U.S. Cl.
  CPC ............... *B64D 5/00* (2013.01); *B64C 39/024* (2013.01); *B64D 1/12* (2013.01); *B64D 3/00* (2013.01); *B64C 2201/182* (2013.01)

(58) Field of Classification Search
  CPC .............. B64D 5/00; B64D 3/00; B64D 3/02; B64D 1/12; B64D 1/22; B64C 39/022; B64C 2201/182; B64C 2201/082
  See application file for complete search history.

(56) References Cited

U.S. PATENT DOCUMENTS

| | | | |
|---|---|---|---|
| 968,339 A | 8/1910 | Geraldson |
| 1,144,505 A | 6/1915 | Steffan |
| 1,306,860 A | 6/1919 | Smith |
| 1,383,595 A | 7/1921 | Black |
| 1,499,472 A | 7/1924 | Pratt |
| 1,716,670 A | 6/1929 | Sperry |
| 1,731,091 A | 10/1929 | Clayton |

(Continued)

FOREIGN PATENT DOCUMENTS

| | | |
|---|---|---|
| CA | 781808 | 4/1968 |
| CA | 839101 | 4/1970 |

(Continued)

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 1999, (23 pp.).

(Continued)

*Primary Examiner* — Brian M O'Hara
(74) *Attorney, Agent, or Firm* — Neal, Gerber & Eisenberg LLP

(57) ABSTRACT

Various embodiments of the present disclosure provide a helicopter-mediated system and method for launching and retrieving an aircraft capable of long-distance efficient cruising flight from a small space without the use of a long runway.

18 Claims, 6 Drawing Sheets

(56) References Cited

U.S. PATENT DOCUMENTS

| | | | |
|---|---|---|---|
| 1,748,663 A | 2/1930 | Tucker | |
| 1,836,010 A | 12/1931 | Audrain | |
| 2,435,197 A | 2/1948 | Brodie | |
| 2,448,209 A | 8/1948 | Boyer et al. | |
| 2,488,050 A | 11/1949 | Brodie | |
| 2,552,115 A | 5/1951 | Replogle | |
| 2,843,337 A | 7/1958 | Bennett | |
| 3,351,325 A | 11/1967 | Cotton | |
| 3,980,259 A | 9/1976 | Greenhalgh et al. | |
| 4,123,020 A | 10/1978 | Korsak | |
| 4,147,317 A | 4/1979 | Mayhew et al. | |
| 4,311,290 A | 1/1982 | Koper | |
| 4,680,962 A | 7/1987 | Durbin | |
| 4,753,400 A | 6/1988 | Reuter et al. | |
| 4,790,497 A | 12/1988 | Yoffe | |
| 4,842,222 A | 6/1989 | Baird | |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,687,930 A | 11/1997 | Wagner et al. | |
| 5,799,900 A | 9/1998 | McDonnell | |
| 6,264,140 B1 | 7/2001 | McGeer et al. | |
| 6,824,102 B2 | 11/2004 | Haggard | |
| 6,874,729 B1* | 4/2005 | McDonnell | B64C 25/68 244/63 |
| 6,961,018 B2 | 11/2005 | Heppe et al. | |
| 7,028,947 B2 | 4/2006 | Burns | |
| 7,066,430 B2 | 6/2006 | Dennis et al. | |
| 7,097,137 B2 | 8/2006 | McDonnell | |
| 7,104,495 B2 | 9/2006 | McGeer | |
| 7,121,507 B2 | 10/2006 | Dennis et al. | |
| 7,140,575 B2 | 11/2006 | McGeer et al. | |
| 7,143,974 B2 | 12/2006 | Roeseler et al. | |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,264,204 B1 | 9/2007 | Portmann | |
| 7,344,108 B2 | 3/2008 | Muylaert et al. | |
| 7,360,741 B2 | 4/2008 | McGeer et al. | |
| 7,410,125 B2 | 8/2008 | Steele | |
| 7,510,145 B2 | 3/2009 | Snediker | |
| 7,665,691 B2 | 2/2010 | Hanzlick et al. | |
| 7,712,702 B2 | 5/2010 | McGeer et al. | |
| 7,954,758 B2 | 6/2011 | McGeer et al. | |
| 8,245,968 B2 | 8/2012 | McGeer et al. | |
| 8,276,844 B2 | 10/2012 | Kariv | |
| 8,313,057 B2 | 11/2012 | Rednikov | |
| 8,348,193 B2 | 1/2013 | McGeer et al. | |
| 8,453,966 B2 | 6/2013 | McGeer et al. | |
| 8,464,981 B2 | 6/2013 | Goldie et al. | |
| 8,573,536 B2 | 11/2013 | McGeer et al. | |
| 8,740,134 B2 | 6/2014 | Suzuki | |
| 2002/0100838 A1 | 8/2002 | McGeer et al. | |
| 2003/0222173 A1 | 12/2003 | McGeer et al. | |
| 2004/0256519 A1 | 12/2004 | Ellis et al. | |
| 2005/0178894 A1 | 8/2005 | McGeer et al. | |
| 2012/0223182 A1 | 9/2012 | Gilchrist et al. | |
| 2013/0161447 A1 | 6/2013 | McGeer et al. | |
| 2014/0263852 A1* | 9/2014 | Walker | B64C 39/022 244/53 R |
| 2015/0129716 A1 | 5/2015 | Yoffe | |

FOREIGN PATENT DOCUMENTS

| | | |
|---|---|---|
| EP | 0 472 613 | 4/1992 |
| EP | 2 186 728 | 5/2010 |
| WO | WO 01/07318 | 2/2001 |
| WO | WO 2008/015663 | 2/2008 |
| WO | WO 2013/171735 | 11/2013 |

OTHER PUBLICATIONS

Aerosonde hazard estimation, T. McGeer, 1994, (7 pp).
Aerosonde Pacific reconnaissance: ready when you are!, T. McGeer, Pacific Northwest Weather Workshop, Mar. 2005, (15 pp).
An Airspeed Vector Sensor for V/STOL Aircraft, E. J. Durbin and T. McGeer, Journal of Aircraft, vol. 19 No. 6, Jun. 1982, (7 pp).
Automated Launch, Recovery, and Refueling for Small Unmanned Aerial Vehicles, K. Mullens et al., 2004 (11 pp).
Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp).
Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).
International Search Report and Written Opinion for International Application No. PCT/US14/32518, mailed Dec. 8, 2014 (9 pages).
Laima: The First Atlantic Crossing by Unmanned Aircraft, T. McGeer, Feb. 1999, (25 pp).
Mini-RPV Recovery System Conceptual Study, Prepared for Eustis Directorate U.S. Army Air Mobility Research and Development Laboratory, Aug. 1977 (322 pages).
Quantitative Risk Management as a Regulatory Approach to Civil UAVs, T. McGeer, L. Newcombe, and J. Vagners, International Workshop on UAV Certification, Jun. 1999, (11 pp).
Regulatory Issues Involving Long-Range Weather Observation by Aerosonde Autonomous Aircraft, T. McGeer, Oct. 1998, (8 pp).
Rotary Action, description of scene of License to Kill, available at http://www.rotaryaction.com/pages/licetkil.html.
Safety, Economy, Reliability and Regulatory Policy of Unmanned Aircraft, T. McGeer, Mar. 2007, (9 pp).
Skyhook (Harrier handling system); Harpoon Head Quarters; available at http://www.harpoondatabases.com/encyclopedia/Entry2979.aspx; printed Jun. 21, 2013 (3 pages).
The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm>. (4 pp).
Wide-Scale Use of Long-Range Miniature Aerosondes Over the World's Oceans, T. McGeer and J. Vagners, 1999, (25 pp).

* cited by examiner

HELICOPTER-MEDIATED SYSTEM AND METHOD FOR LAUNCHING AND RETRIEVING AN AIRCRAFT

PRIORITY CLAIM

This patent application is a continuation-in-part of, and claims priority to and the benefit of, U.S. patent application Ser. No. 14/230,454, filed on Mar. 31, 2014, which claims priority to and the benefit of U.S. Provisional Patent Application No. 61/808,392, filed on Apr. 4, 2013, and U.S. Provisional Patent Application No. 61/807,508, filed on Apr. 2, 2013, the entire contents of each of which are incorporated herein by reference.

BACKGROUND

It is well known in the aeronautical sciences that an aircraft capable of hover and/or of slow flight is typically not well-suited to long-distance efficient cruising flight. One drawback of aircraft capable of long-distance efficient cruising flight is that such aircraft typically require long runways to be utilized for take-off and landing. This becomes problematic when there is not sufficient space for the requisite runway, meaning that such aircraft may not be used.

Certain known or proposed aircraft launch, retrieval, or launch and retrieval systems and methods have attempted to solve these problems, but are each flawed in multiple manners. A first known or proposed aircraft launch and retrieval method employs a rotary wing aircraft to facilitate launch and retrieval of a fixed wing aircraft. To launch the fixed wing aircraft in the first known or proposed aircraft launch and retrieval method, the rotary wing aircraft is stiffly mated to the fixed wing aircraft via insertion of a plurality of balls mounted to the fixed wing aircraft into corresponding socket structures of the rotary wing aircraft. After mating, the rotary wing aircraft hoists the fixed wing aircraft, accelerates to a desired airspeed, and releases the fixed wing aircraft. To retrieve the fixed wing aircraft in the first known or proposed aircraft launch and retrieval method, this process is reversed—the rotary wing aircraft matches the airspeed of the fixed wing aircraft, stiffly mates with the fixed wing aircraft in midair, decelerates, and carries the fixed wing aircraft to a desired landing area.

This first known or proposed aircraft launch and retrieval method has numerous disadvantages. One disadvantage is that retrieving the fixed wing aircraft by stiffly mating the rotary wing aircraft to the fixed wing aircraft in midair is impractical in that it requires extreme precision and is unforgiving. Specifically, retrieval involves the rotary wing aircraft matching the fixed wing aircraft's airspeed, aligning each socket structure above its corresponding ball, and decreasing its altitude such that each socket structure receives and secures its corresponding ball. Even partial improper performance of one of these steps could result in retrieval failure, or worse: damage to either aircraft. Retrieval becomes even more complex in adverse weather conditions, such as rain or high winds, when aircraft movement becomes even more imprecise and unpredictable. Another disadvantage with this first known or proposed aircraft launch and retrieval method is that retrieving the fixed wing aircraft by stiffly mating the rotary wing aircraft to the fixed wing aircraft in midair is (relatively) high fuel costs—the operator must ensure that the rotary wing aircraft has enough fuel to chase the fixed wing aircraft to mate therewith. Launch using the first known or proposed aircraft launch and retrieval method is also problematic since imperfectly-synchronized release of the multiple connections can lead to destruction of both the rotary wing aircraft and the fixed wing aircraft.

A second known or proposed aircraft retrieval method employs a helicopter to facilitate retrieval of a fixed wing aircraft. To retrieve the fixed wing aircraft from wing-borne flight in the second known or proposed aircraft retrieval method, the helicopter hovers at a designated altitude while supporting a complex capture apparatus. In one proposed embodiment, this capture apparatus includes a horizontal beam from which a plurality of capture lines freely dangle (i.e., have one end connected to the horizontal beam and one free end). The helicopter is attached to a fixture, such as a vehicle, via an attachment line. The fixed wing aircraft is flown such that the fixed wing aircraft avoids the attachment line and contacts and captures one of the dangling capture lines.

This second known or proposed aircraft retrieval method has numerous disadvantages. One disadvantage due to the freely dangling capture lines is that the likelihood of capture is lower if the fixed wing aircraft contacts a capture line near its free end. For instance, if the fixed wing aircraft contacts a capture line near its free end, the capture line may simply bounce off of the fixed wing aircraft and upward, making capture impossible at this point. This minimizes the window within which the fixed wing aircraft may approach the helicopter for capture, increasing the difficulty of capture. Another disadvantage due to the freely dangling capture lines is that, after the fixed wing aircraft captures a capture line, the momentum of the fixed wing aircraft may cause the fixed wing aircraft to wrap-around the horizontal beam and contact the helicopter, with disastrous results. Another disadvantage is that the fixed wing aircraft must approach the helicopter in a direction that is substantially perpendicular to the horizontal beam. In other words, the fixed wing aircraft must approach the helicopter in one of only two directions-toward the front of the helicopter substantially perpendicularly to the beam or toward the rear of the helicopter substantially perpendicularly to the beam. Otherwise, the fixed wing aircraft would contact the attachment line during capture. Another disadvantage is that the fixed wing aircraft must avoid the attachment line while aiming for the capture lines, adding complexity to controlling the fixed wing aircraft during retrieval. Another disadvantage is that continued movement of the fixed wing aircraft after capture will violently jerk the helicopter a certain distance while the fixed wing aircraft is decelerating, which could damage the helicopter or the capture apparatus.

A third known or proposed aircraft retrieval method employs a kite, a balloon, or a crane and a tether to facilitate retrieval of a fixed wing aircraft. To retrieve the fixed wing aircraft from wing-borne flight in the third known or proposed aircraft retrieval method, the kite, balloon, or crane is used to suspend the tether between the kite, balloon, or crane and a fixture on the ground or a vehicle. The fixed wing aircraft is flown such that the fixed wing aircraft contacts and captures the tether.

This third known or proposed aircraft retrieval method has numerous disadvantages. One disadvantage when the third known or proposed aircraft retrieval method employs a kite or a balloon is that the kite or balloon cannot be maneuvered by the operator. The kite or balloon is thus vulnerable to poor weather conditions that could wreak havoc on the stability of the tether. For instance, high winds could cause location and/or altitude of the kite or balloon—and the location, altitude, and orientation of the tether suspended therefrom—to vary wildly, making it difficult to capture the tether with the fixed wing aircraft. One disadvantage when the third known or proposed aircraft retrieval method employs a kite is that, in most instances, the kite must be anchored to a moving vehicle (such as a boat at sea) to ensure that the kite remains airborne during retrieval. This makes land-based retrieval using the kite impractical at best and impossible at worst. One disadvantage when the third known or proposed aircraft retrieval method employs a crane that is expensive, heavy, and limits the flexibility of the third known or proposed aircraft retrieval method—it is difficult, time-consuming, and expensive to move a crane from one location to another to conduct retrievals in different places and also difficult to compactly stow a crane.

A fourth known or proposed aircraft retrieval method employs a helicopter to facilitate retrieval of a fixed wing aircraft. To retrieve the fixed wing aircraft from wing-borne flight in the fourth known or proposed aircraft launch and retrieval method, one end of a line is connected to a helicopter and a free end of the line dangles below the helicopter. The fixed wing aircraft is flown such that the fixed wing aircraft contacts and captures the line.

This fourth known or proposed aircraft retrieval method has numerous disadvantages. One disadvantage due to the freely dangling line is that the likelihood of capture is lower if the fixed wing aircraft contacts the line near its free end. For instance, if the fixed wing aircraft contacts the line near its free end, the line may simply bounce off of the fixed wing aircraft and upward, making capture impossible at this point. This minimizes the window within which the fixed wing aircraft may approach the helicopter for capture, increasing the difficulty of capture. Another disadvantage due to the freely dangling line is that, after the fixed wing aircraft captures the line, the momentum of the fixed wing aircraft may cause the fixed wing aircraft to wrap-around and contact the helicopter, with disastrous results. Another disadvantage is that continued movement of the fixed wing aircraft after capture will violently jerk the helicopter a certain distance while the fixed wing aircraft is decelerating, which could damage the helicopter.

There is a need for new systems and methods by which aircraft that otherwise require a long runway may be launched and retrieved from small spaces that solve these problems.

SUMMARY

The present disclosure solves the above-described problems by providing a helicopter-mediated system and method for launching and retrieving an aircraft capable of long-distance efficient cruising flight from a small space without the use of a long runway (sometimes referred to herein as the "aircraft launch and retrieval system" for brevity).

Generally, in various embodiments, to launch an aircraft using the aircraft launch and retrieval system of the present disclosure, a helicopter is stiffly mechanically connected to the aircraft, hoists the aircraft to a desired altitude and accelerates to a desired airspeed, and then releases the aircraft into wing-borne flight.

Generally, in various embodiments, to retrieve the aircraft from wing-borne flight using the aircraft launch and retrieval system of the present disclosure, a tether is connected to the helicopter and an anchor assembly, the helicopter is flown above and station-keeps above the anchor assembly to extend the tether therebetween, and the aircraft is flown such that the aircraft contacts and captures a part of the tether extending between the tether and the anchor assembly. The continued movement of the aircraft following capture of the tether causes the anchor assembly to pay out tether and impose a resistive force opposing movement of the aircraft to decelerate the aircraft.

More specifically, in one embodiment, the aircraft launch and retrieval system includes a helicopter, a tether, and an anchor assembly. To launch an aircraft using this embodiment of the aircraft launch and retrieval system, a first connector attached to the underside of the helicopter is stiffly and releasably connected to a second connector attached to the aircraft, such as a hook attached to the top surface of the aircraft's fuselage. After the helicopter and the aircraft are connected to one another, the helicopter hoists the aircraft to a desired altitude, and accelerates to bring the aircraft to a suitable airspeed. Once the desired altitude and airspeed are reached, the first and second connectors are disconnected from each other, whereby the aircraft is released into wing-borne flight.

In this embodiment, in preparation for retrieval of the aircraft from wing-borne flight, the tether is connected to the helicopter and to the anchor assembly, and the helicopter is flown to a designated height above the anchor assembly such that a first portion of the tether extends between the helicopter and the anchor assembly and a second portion of the tether is maintained within or otherwise near the anchor assembly. Here, the designated height above the anchor assembly is determined such that, once the helicopter reaches that designated height, the tension in the portion of the tether extending between the helicopter and the anchor assembly is substantially equal to a designated tension. Once the helicopter reaches the designated height above the anchor assembly, the helicopter hovers substantially at that designated height and station-keeps (either automatically or via manual operator control) along a substantially horizontal plane such that, during retrieval of the aircraft, the helicopter remains substantially aligned above the point at which the tether is connected to the anchor assembly.

Once the helicopter is hovering above the anchor assembly at the designated height above the anchor assembly, the aircraft is flown toward, contacts, and captures part of the portion of the tether extending between the helicopter and the anchor assembly via a tether capture device near the end of one of the aircraft's wings. The motor of the aircraft is then shut down. After the aircraft captures the part of the portion of the tether extending between the helicopter and the anchor assembly, continued movement of the aircraft and the captured part of the tether relative to the anchor assembly imposes a pulling force on the portion of the tether extending between the helicopter and the anchor assembly in the direction away from the anchor assembly. The anchor assembly is configured such that this pulling force causes the anchor assembly to begin paying out the tether. While the anchor assembly is paying out the tether, the anchor assembly imposes a resistive force on the portion of the tether extending between the helicopter and the anchor assembly. This resistive force causes the imposition of a force on the aircraft that counteracts the continued movement of the aircraft, thereby causing the aircraft to decelerate and come to a stop hanging below the helicopter. Thereafter, the helicopter lowers the aircraft into a docking fixture.

The aircraft launch and retrieval system of the present disclosure solves the above-identified problems with previously-known or proposed aircraft launch, retrieval, or launch and retrieval systems and methods.

Turning to the first known or proposed aircraft retrieval method described above, unlike the first known or proposed aircraft retrieval method, the aircraft retrieval system and method of the present disclosure is forgiving, does not require extreme precision to retrieve the aircraft, and has a smaller risk of damaging either the helicopter or the aircraft.

Turning to the second known or proposed aircraft retrieval method described above, unlike the dangling capture lines of the second known or proposed aircraft retrieval method, the tether of the aircraft retrieval system and method of the present disclosure does not dangle freely during retrieval, and is instead attached to both the helicopter and the anchor assembly. This enables the aircraft to easily capture the tether nearly anywhere along the length of the tether, and prevents the aircraft from wrapping around and contacting the helicopter after capture. Further, unlike the second known or proposed aircraft retrieval method, the aircraft may approach the tether of the aircraft retrieval system and method of the present disclosure from any angle without substantially affecting its ability to capture the tether. In other words, the aircraft is not required to approach the tether in one of a only limited number of viable directions. Also, unlike the second known or proposed aircraft retrieval method, the aircraft retrieval system and method of the present disclosure eliminates complexity by including a single tether for the aircraft to capture; if the aircraft misses this single line, then in continues in undisturbed flight without running the risk of improperly contacting another capture line. Additionally, unlike the second known or proposed aircraft retrieval method, the combination of the anchor assembly of the aircraft retrieval system and method of the present disclosure paying out tether after capture and imposing a resistive force to slow the aircraft ensures that the helicopter will not be violently jerked after the aircraft captures the tether.

Turning to the third known or proposed aircraft retrieval method described above, unlike the kite or balloon of the third known or proposed aircraft retrieval method, the helicopter of the aircraft retrieval system and method of the present disclosure is highly maneuverable and can be used in non-ideal weather conditions. Further, unlike the kite of the third known or proposed aircraft retrieval method, the helicopter of the aircraft retrieval system and method of the present disclosure can be readily used for land-based retrieval. Also, unlike the crane of the third known or proposed aircraft retrieval method, the helicopter of the aircraft retrieval system and method of the present disclosure is (relatively) low-weight and thus inexpensively portable.

Turning to the fourth known or proposed aircraft launch and retrieval method described above, unlike the line of the fourth known or proposed aircraft retrieval method, the tether of the aircraft retrieval system and method of the present disclosure does not dangle freely during retrieval, and is instead attached to both the helicopter and the anchor assembly. This enables the aircraft to easily capture the tether nearly anywhere along the length of the tether and prevents the aircraft from wrapping around and contacting the helicopter after capture. Also, unlike the fourth known or proposed aircraft retrieval method, the combination of the anchor assembly of the aircraft retrieval system and method of the present disclosure paying out tether after capture and imposing a resistive force to slow the aircraft ensures that the helicopter will not be violently jerked after the aircraft captures the tether.

Additional features and advantages of the present disclosure are described in, and will be apparent from, the following Detailed Description and the Figures.

DETAILED DESCRIPTION

Launch of an Aircraft into Wing-Borne Flight Using a Helicopter

Figure 1:
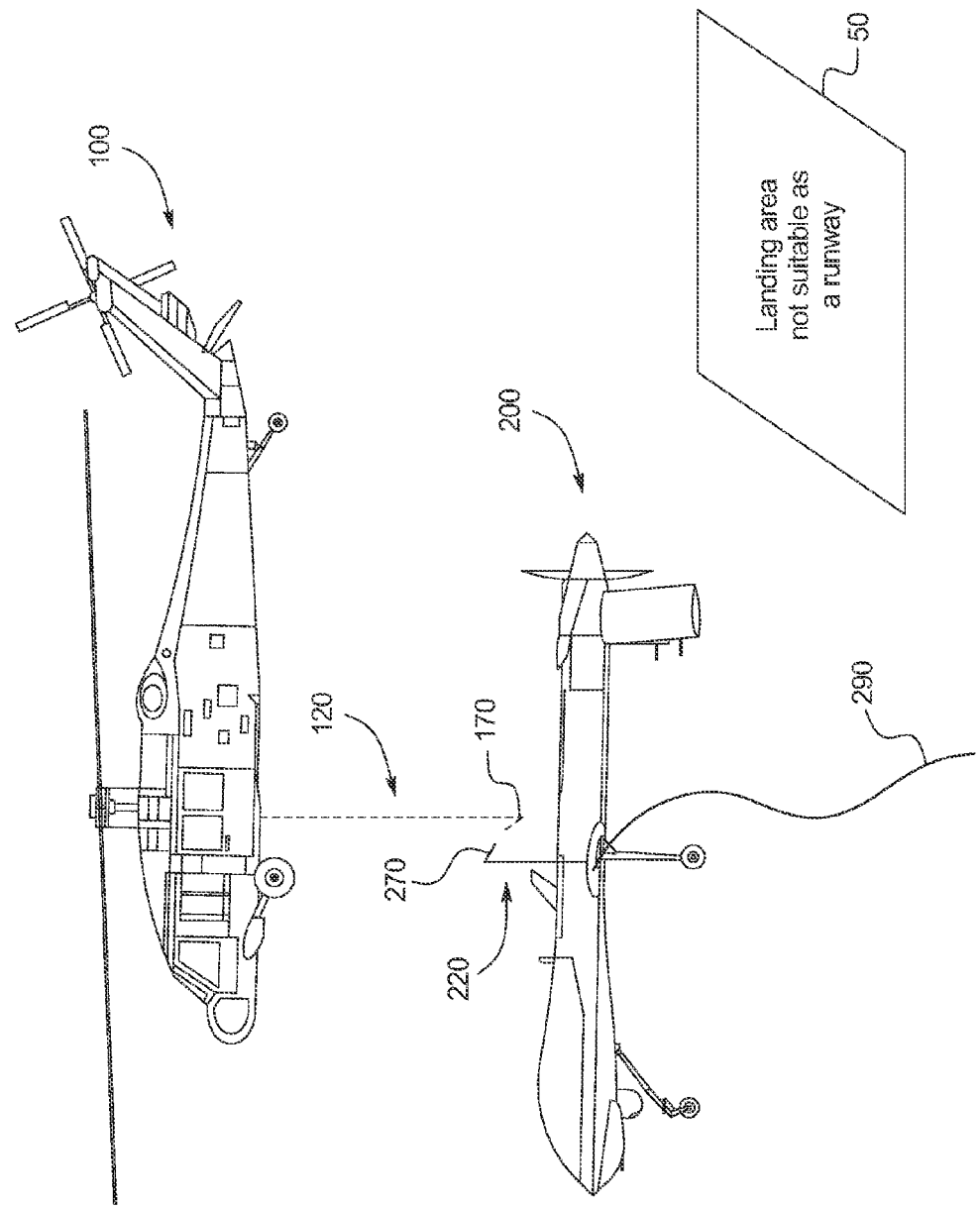
FIG. 1 is a side view of example devices of the present disclosure that facilitate helicopter-mediated launch and retrieval of an aircraft.

Referring now to the drawings, in one example embodiment illustrated in FIG. 1, a helicopter 100 (which may be manned or unmanned and include any suitable quantity of rotors) includes a first connector 120 connected to and extending from the helicopter 100, and an aircraft 200 (such as a fixed-wing aircraft capable of long-distance efficient cruising flight or any other suitable aircraft) includes a second connector 220 connected to and extending from the aircraft 200. In one embodiment, at least a portion of the first connector is flexible and the second connector is rigid. In another embodiment, both the first connector and the second connector are rigid. In another embodiment, the first connector is rigid and at least a portion of the second connector is flexible. In another embodiment, at least a portion of the first connector is flexible and at least a portion of the second connector is flexible.

The first connector 120 includes a first gripper or mating device 170 at a bottom end (with respect to the orientation shown in FIG. 1), and the second connector 220 includes a second gripper or mating device 270 (such as a hook mounted to the fuselage of the aircraft 200) at a top end (with respect to the orientation shown in FIG. 1). The first and second mating devices 170 and 270 are configured to mate with one another and releasably connect to one another (such as by latching together or otherwise mechanically securely coupling together) to link the helicopter 100 with the aircraft 200 and facilitate launch of the aircraft 200 (as described below). In certain embodiments, at least one of the first and second connectors includes a locking mechanism configured to connect and lock the first and second mating devices together and to disconnect and release the first and second mating devices from one another. It should be appreciated that, once mated and connected to one another, the mating devices 170 and 270 only disconnect from each other when it is desired to separate the linkage between the helicopter 100 and the aircraft 200.

The first connector 120 is configured to enable the first mating device 170 to rendezvous with, mate with, and connect to the second mating device 270 of the second connector 220 when linkage between the helicopter 100 and the aircraft 200 is desired when the helicopter 100 is airborne and the aircraft 200 is substantially stationary (such as when the aircraft 200 is on the ground and not moving relative to the ground). It should be appreciated that the first connector is stabilized and tip-guided to facilitate such procedures while the helicopter 100 is in forward flight.

The second connector 220 is configured to create a rendezvous target with sufficient physical separation from sensitive components of the aircraft 200 such that any impact between such sensitive components and the first connector 120 during mating and connecting of first and second mating devices 170 and 270 is unlikely. Additionally, the second connector 220 is configured to minimize weight and to minimize drag, particularly when the aircraft 200 is in wing-borne flight, whether the second connector 220 is in a deployed configuration, as shown in FIG. 1, or in a stowed configuration (not shown).

It should be appreciated that the first and second connectors are configured to stably support the aircraft when the aircraft is linked with the helicopter.

In this example embodiment, the aircraft 200 includes one or more retractable lay lines 290 deployable from, and retractable into (when not in use), any suitable portion of the aircraft 200 (such as the wings of the aircraft 200). In this example embodiment, as described below, the lay lines 290 are deployed during retrieval to enable a ground crew and/or ground equipment to guide the aircraft 200 safely into the landing area 50. In other embodiments the aircraft does not include any such lay lines.

To launch the aircraft 200 when the aircraft 200 is initially stationary (such as when the aircraft 200 is on the ground and not moving relative to the ground), in one example, the first mating device 170 of the first connector 120 is stiffly mated with and connected to the second mating device 270 of the second connector 220 of the aircraft 200 (such as via the locking mechanism) to link the helicopter 100 with the aircraft 200. In one example embodiment, this is accomplished by maneuvering the helicopter 100 relative to the aircraft 200 such that the first mating device 170 of the first connector 120 of the helicopter 100 mates with and connects to the second mating device 270 of the second connector 220 of the aircraft 200 to link the helicopter 100 with the aircraft 200. After the helicopter 100 is linked with the aircraft 200, the helicopter 100 hoists the aircraft 200 to a desired altitude and accelerates to bring the aircraft 200 to a suitable airspeed. Once the desired altitude and airspeed are reached, the first and second mating devices 170 and 270 are disconnected from each other. Once the first and second mating devices 170 and 270 are disconnected from one another, the aircraft 200 is released into wing-borne flight, gains speed in a dive, and continues normal flight.

In various embodiments, to facilitate releasing the aircraft 200 into wing-borne flight, the linked, airborne helicopter 100 and aircraft 200 are operated such that the loads on the connected first and second mating devices 170 and 270 of the first and second connectors 120 and 220 are minimized just before the first and second mating devices 170 and 270 are disconnected from one another. Once such loads are minimized, the first and second mating device 170 and 270 are disconnected from one another, such as by: (a) the first mating device 170 initiating the disconnection from the second mating device 270, (b) the second mating device 270 initiating the disconnection from the first mating device 170, (c) the first mating device 170 and the second mating device 270 initiating the disconnection from the other mating device, or (d) a device separate from the first and second mating devices 170 and 270 initiating the disconnection of the first and second mating devices 170 and 270.

In various example embodiments, to minimize the loads on the connected first and second mating devices 170 and 270 of the first and second connectors 120 and 220 to facilitate the disconnection of the first and second mating devices 170 and 270 (and, therefore, the disconnection of the helicopter 100 and the aircraft 200 and the release of the aircraft 200 into wing-borne flight): (a) the helicopter 100 descends relative to the aircraft 200, (b) the helicopter 100 descends relative to the aircraft 200 and reduces its speed relative to the speed of the aircraft 200, (c) the aircraft 200 ascends relative to the helicopter 100, (d) the aircraft 200 ascends relative to the helicopter 100 and increases its speed relative to the speed of the helicopter 100, or (e) any suitable combination thereof.

In the above-described example embodiment, the aircraft is stationary prior to being hoisted by the helicopter. In another embodiment, the aircraft is mobile prior to being hoisted by the helicopter. For example, a short runway may be utilized to slowly move the aircraft prior to the helicopter hoisting the aircraft.

Figure 2:
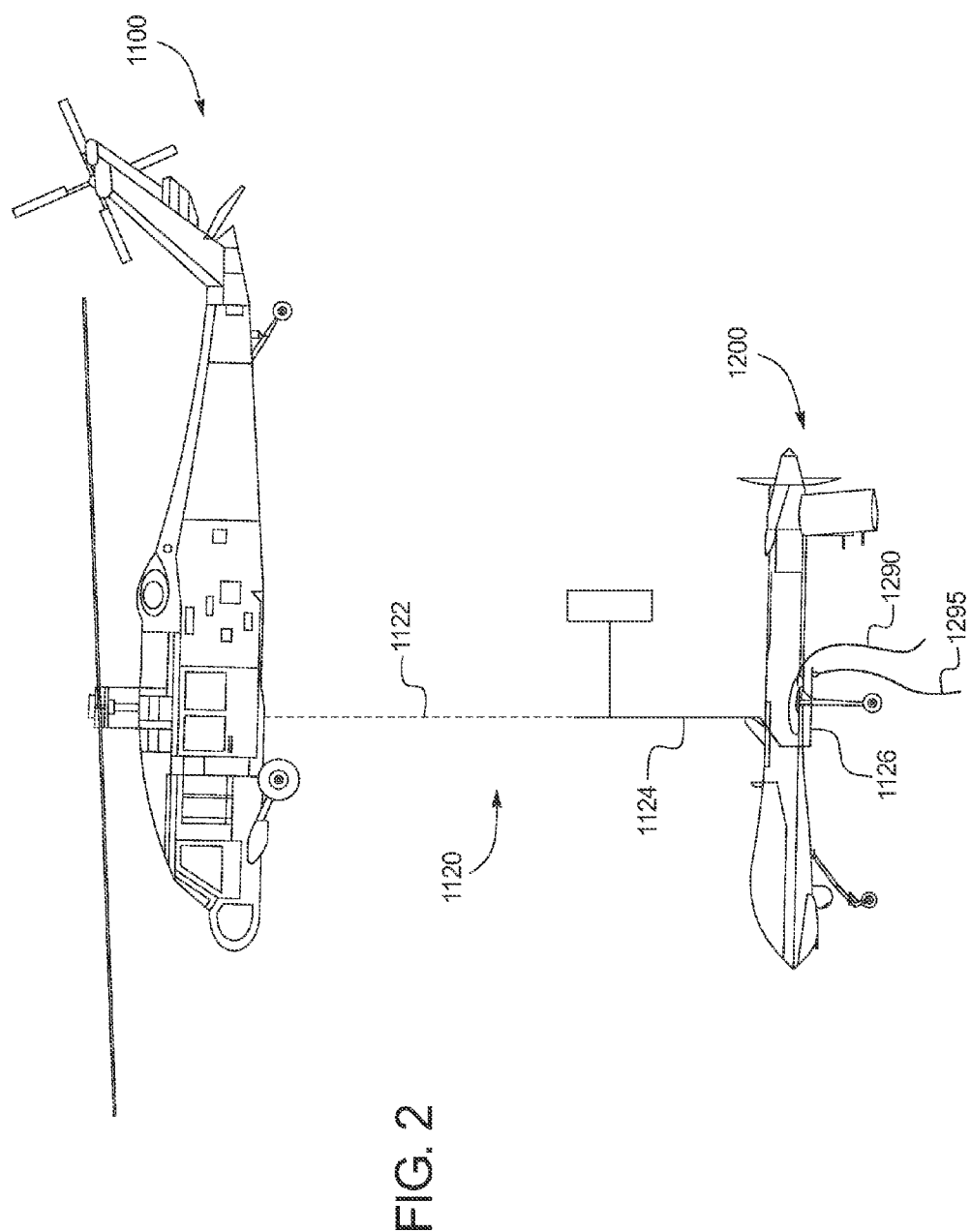
FIG. 2 is a side view of other example devices of the present disclosure that facilitate helicopter-mediated launch and retrieval of an aircraft.

Turning to FIG. 2, in another example embodiment, a helicopter 1100 includes an aircraft capturer 1120 connected to and extending from the helicopter 1100. In this example, the aircraft capturer 1120 includes a flexible tether 1122 (though in other embodiments the tether is rigid or at least partially rigid) connected to and extending from the helicopter 1100 and a capture device 1124 connected to an end of the tether 1122 opposite the end of the tether 1122 connected to the helicopter 1100. The capture device 1124 includes a mating device 1126 configured to mate with and releasably connect to (such as by latching to or otherwise mechanically coupling to) a portion of the aircraft 1200. Thus, the mating device 1126 is configured to releasably connect the capture device 1124 (and, therefore, the aircraft capturer 1120) to the portion of an aircraft 1200. This connection links the helicopter 1100 with the aircraft 1200 and facilitates launch and retrieval of the aircraft 1200 (as described below). In certain embodiments, at least one of the mating device and the aircraft includes a locking mechanism configured to connect and lock the mating device together with the aircraft and to disconnect and release the mating device and the aircraft from one another. It should be appreciated that, once the mating device 1126 connects to the aircraft 1200, the mating device 1126 only disconnects from the aircraft 1200 when it is desired to separate the linkage between the helicopter 1100 and the aircraft 1200.

The aircraft capturer is configured to fly stably when trailed below a cruising helicopter while being guided into appropriate contact with an aircraft. For instance, in this example embodiment, the aircraft capturer 1120 includes a stabilizer 1128 configured to stabilize the aircraft capturer 1120 during flight. The aircraft capturer also includes features that enable stable behavior of the linked helicopter and aircraft in all phases of flight, including hover, forward flight, acceleration, and deceleration. Further, the aircraft capturer is configured to stably support the aircraft when it is linked with the helicopter.

In this example, the aircraft 1200 include one or more lay lines 1290 and the mating device 1126 includes one or more lay lines 1295, which are described above. In this example, the lay lines are retractable, while in other embodiments the lay lines are not retractable. In other embodiments, only one of the aircraft and the mating device includes one or more lay lines. In further embodiments, the aircraft capturer includes one or more lay lines that are stowable somewhere other than the mating device. In other embodiments the aircraft does not include any such lay lines.

To launch the aircraft 1200 when the aircraft 1200 is initially stationary, in one example, the helicopter 1100 is maneuvered such that the mating device 1126 mates with and connects to a portion of the aircraft 1200 to link the helicopter 1100 with the aircraft 1200. After the helicopter 1100 is linked to the aircraft 1200, the helicopter 1100 hoists the aircraft 1200 to a desired altitude and accelerates to bring the aircraft 1200 to a suitable airspeed. Once the desired altitude and airspeed are reached, the mating device 1126 is disconnected from the aircraft 1200, breaking the linkage between the helicopter 1100 and the aircraft 1200 and releasing the aircraft 1200 into wing-borne flight.

Figure 3:
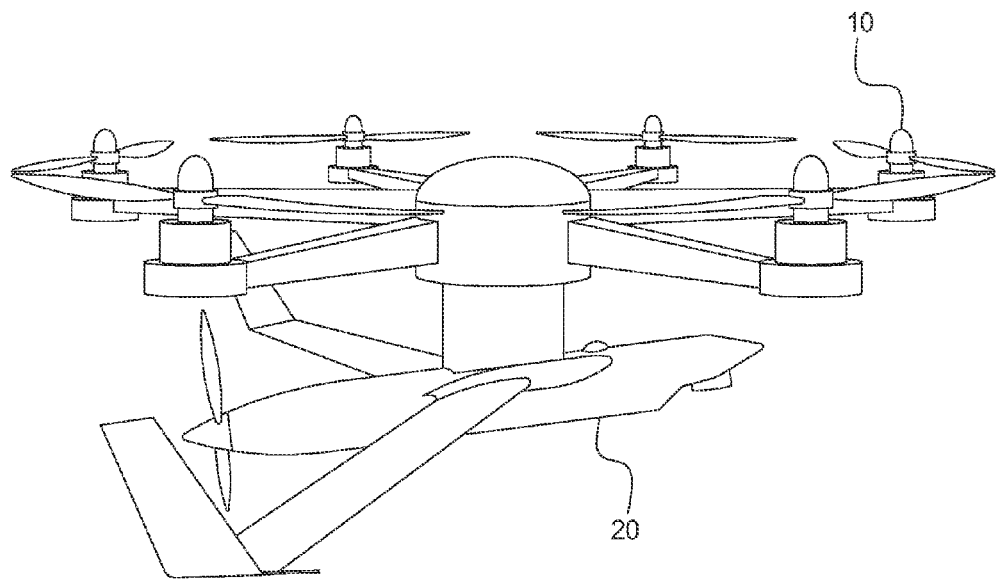
FIG. 3 is a side view of an unmanned multi-rotor helicopter carrying an unmanned aircraft before releasing the aircraft into wing-borne flight.

In certain embodiments, one or both of the first and second mating devices are configured such that the pitch angle of the aircraft is variable by the operator. Put differently, in these embodiments, the operator may manipulate one or both of the first and second mating devices to control the pitch rate of the aircraft upon release. One such embodiment is depicted in FIG. 3, which depicts an unmanned multi-rotor helicopter 10 hoisting an unmanned winged aircraft 20 using fixtures on both the helicopter and the aircraft. These fixtures are configured such that the aircraft pitch, roll, and yaw attitude is suitable for release into stable wing-borne flight, even as the helicopter 10 is pitched into a nose-down attitude for forward flight. When flight conditions are reached suitable for subsequent wing-borne flight of the aircraft 20, the aircraft 20 is released to fly conventionally.

Figure 4:
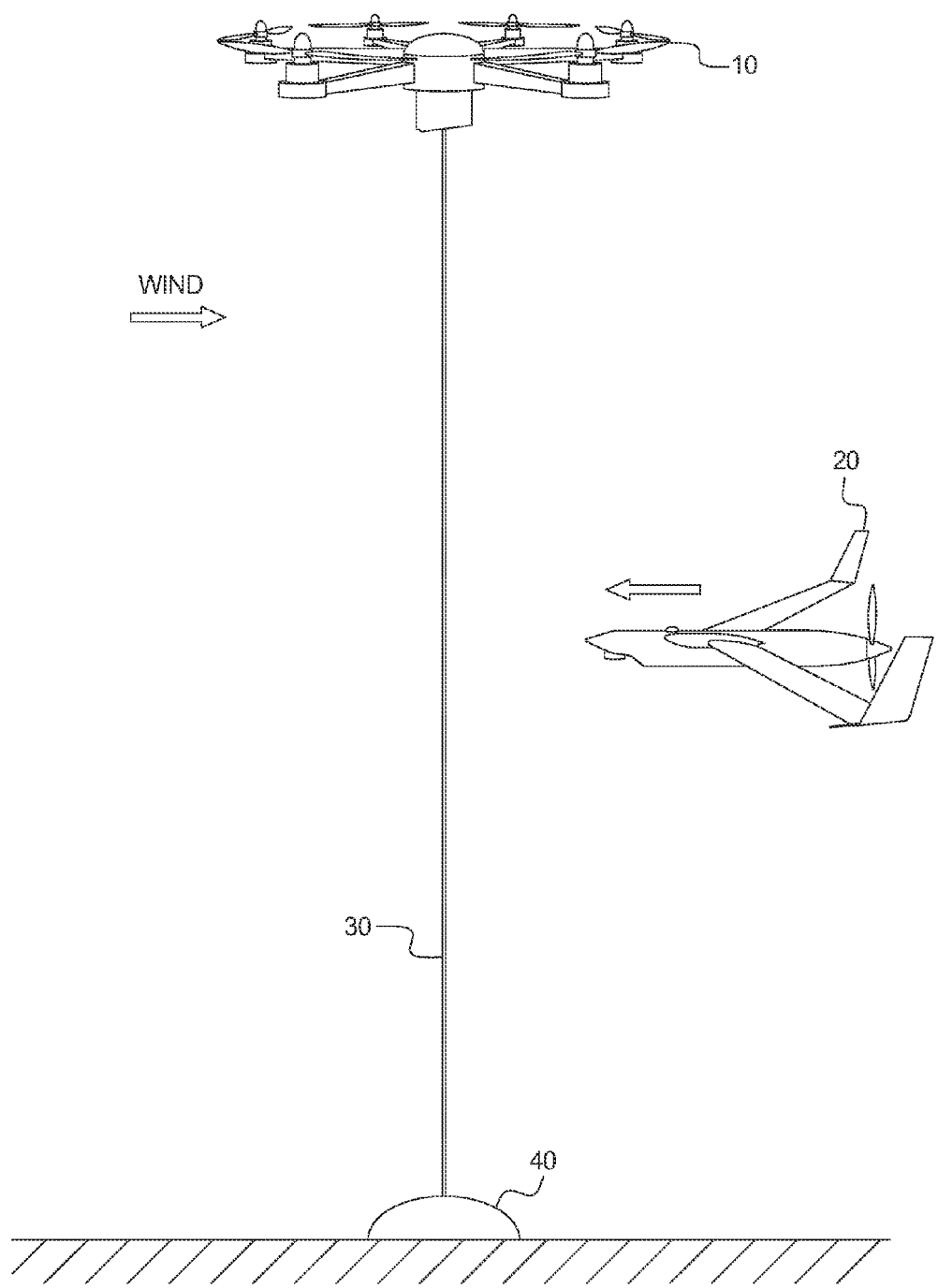
FIG. 4 is a side view of an aircraft retrieval system of the present disclosure including the helicopter of FIG. 3, a tether, and an anchor assembly before retrieval of the aircraft of FIG. 3.
Figure 5:
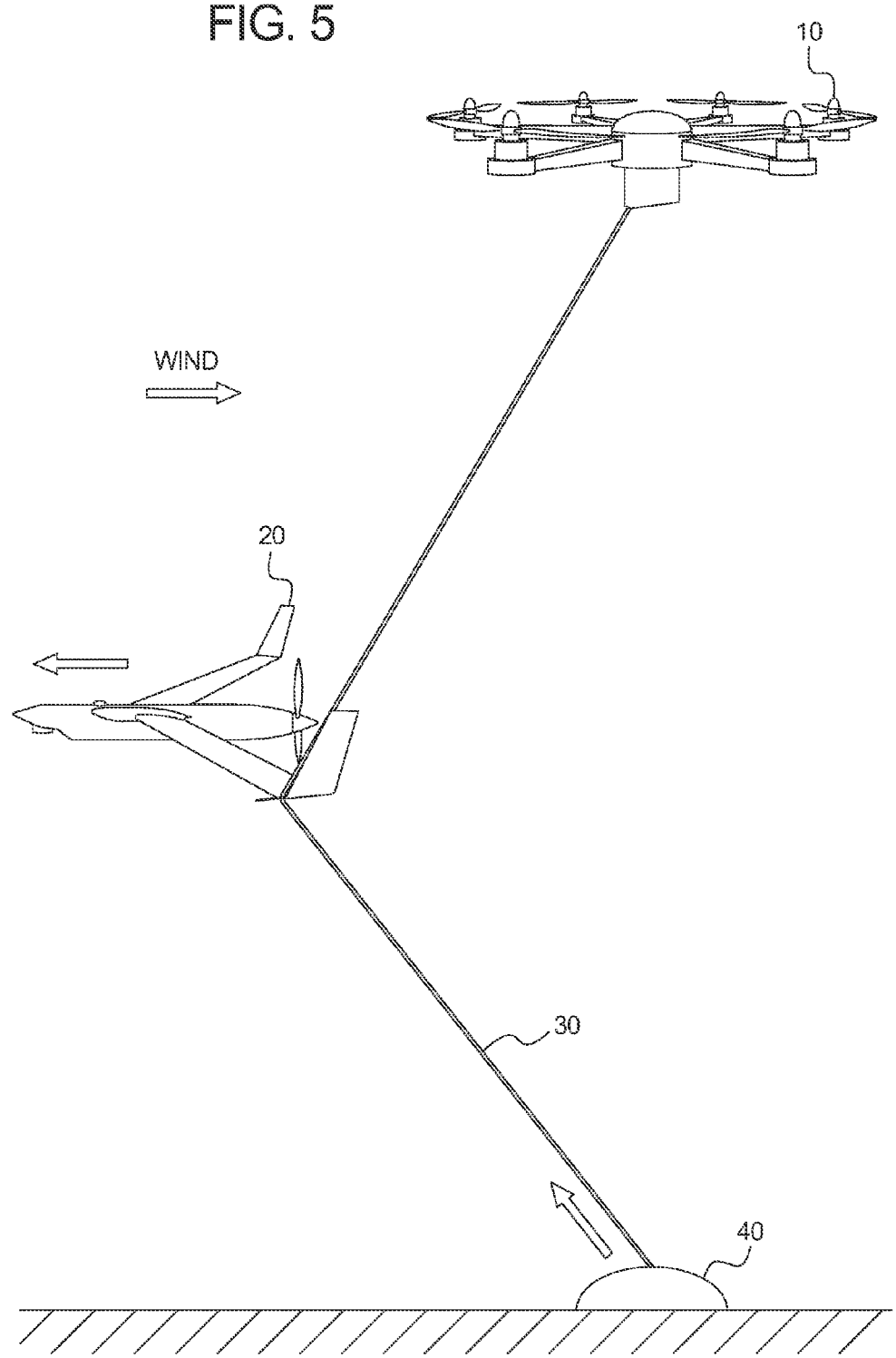
FIG. 5 is a side view of the aircraft retrieval system of FIG. 4 after the aircraft has captured the tether.
Figure 6:
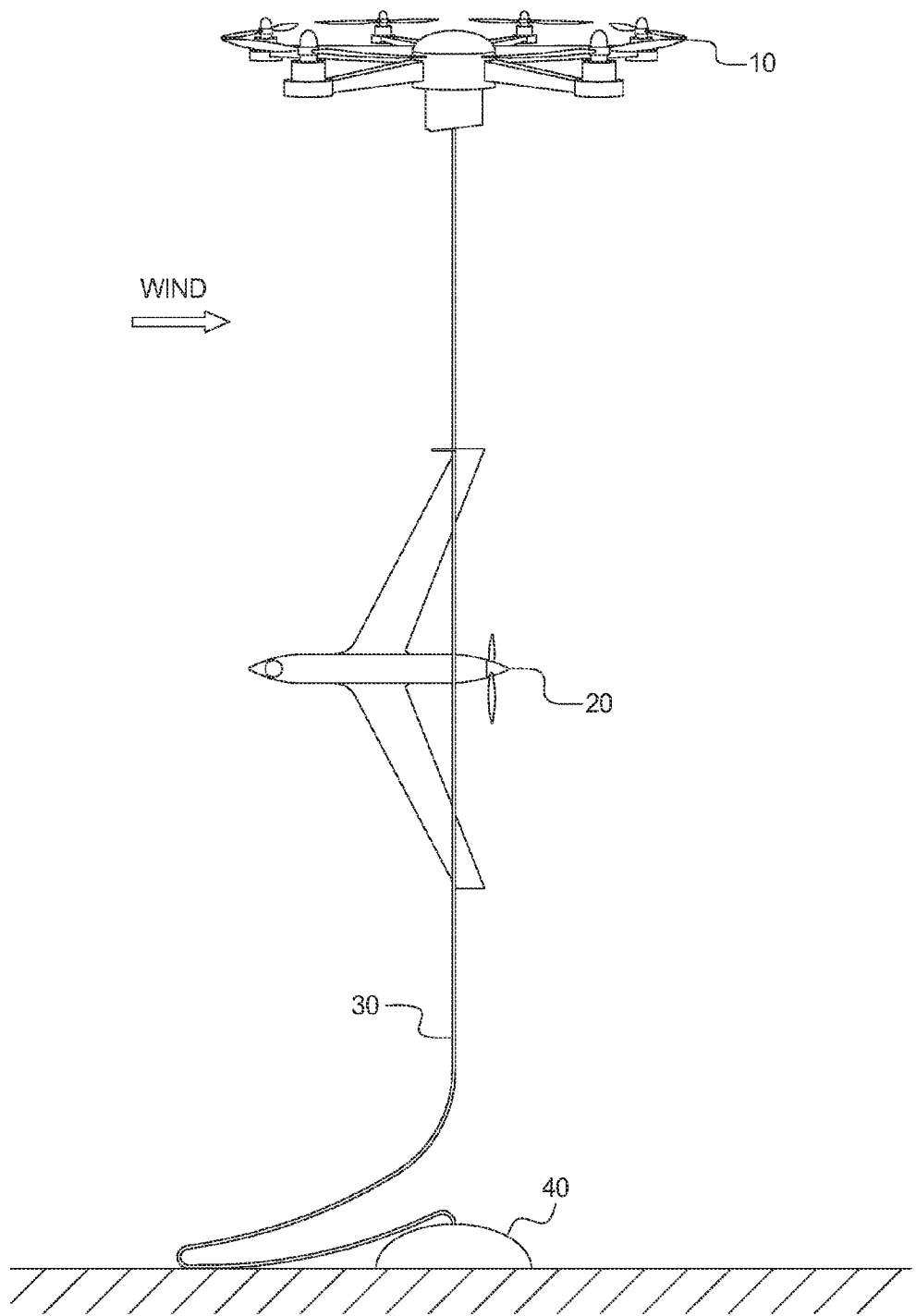
FIG. 6 is a side view of the aircraft retrieval system of FIGS. 4 and 5 after the aircraft retrieval system has stopped the aircraft from moving.

Retrieval of an Aircraft from Wing-Borne Flight Via Capture of a Tether Suspended Between the Helicopter and an Anchor Assembly As best shown in FIGS. 4 to 6, in certain embodiments, an aircraft retrieval system including the helicopter 10, a tether 30, and an anchor assembly 40 is used to retrieve the aircraft 20 from wing-borne flight. This system is particularly applicable to relatively small aircraft that are sufficiently tough to enable dangling from a hook on either wing, said hook engaging a tether as described below. Such aircraft are typically unmanned. In various embodiments, the helicopter 10 is the same helicopter used to launch the aircraft 20 into wing-borne flight in one of the above-described manners. In such embodiments, the helicopter with its aircraft mating device for hoisting the aircraft, the tether, the anchor assembly, and the hooks on the aircraft together comprise an aircraft launch and retrieval system.

In this illustrated embodiment and as best shown in FIG. 4, in preparation for retrieval of the aircraft 20: (1) a portion of the tether 30 is connected to the helicopter 10 at a point at or near the center-of-lift of the helicopter 10, (2) another portion of the tether 30 is connected to the anchor assembly 40, and (3) the helicopter 10 is flown to a designated height (or within a designated range of heights) above the anchor assembly 40. When the helicopter 10 reaches the designated height above the anchor assembly 40, a first portion of the tether 30 extends between the helicopter 10 and the anchor assembly 40 and a second portion (not shown) of the tether 30 is maintained within or otherwise near the anchor assembly 40 (i.e., does not (yet) extend between the helicopter 10 and the anchor assembly 40). In certain embodiments, the designated height is determined such that, when the helicopter 10 reaches the designated height above the anchor assembly 40, the tension in the first portion of the tether is substantially equal to a designated tension.

Once the helicopter 10 reaches the designated height above the anchor assembly 40, the helicopter 10 station-keeps (either automatically or via manual operator control) along a substantially horizontal plane such that, during retrieval of the aircraft 20, the center-of-lift of the helicopter 10 remains substantially aligned above the point at which the tether 30 is connected to the anchor assembly 40. The helicopter 10 does so regardless of whether the anchor assembly 40 is stationary (e.g., located on the ground) or moving (e.g., located on a vehicle, such as the deck of a ship at sea).

As shown in FIG. 4, once the helicopter 10 is hovering above the anchor assembly 40 at the designated height, the aircraft 20 is flown toward, contacts, and captures part of the portion of the tether 30 extending between the helicopter 10 and the anchor assembly 40 in a manner similar to that described in U.S. Pat. No. 6,264,140, the entire contents of which are incorporated herein by reference. Specifically, the aircraft 20 is flown toward the portion of the tether 30 extending between the helicopter 10 and the anchor assembly 40 such that the leading edge of one of the wings of the aircraft 20 contacts the tether 30. After the leading edge of one of the wings of the aircraft 20 contacts the tether 30, continued movement of the aircraft 20 relative to the tether 30 causes the tether 30 to slide away from the fuselage of the aircraft 20 along the leading edge of the wing toward the end of the wing until a tether capture device (not shown) near the end of the wing captures part of the tether 30. Once the tether capture device of the aircraft 20 captures the part of the tether 30, the tether capture device holds that part of the tether 30 such that the aircraft 20 does not substantially move relative to the tether 30. It should thus be appreciated that the aircraft captures the same tether that connects the helicopter and the anchor assembly. At this point, the motor of the aircraft 20 is shut down.

After the tether capture device of the aircraft 20 captures the part of the tether 30, continued movement of the aircraft 20 and the captured part of the tether 30 relative to the anchor assembly 40 imposes a pulling force on the portion of the tether 30 extending between the helicopter 10 and the anchor assembly 40 in the direction away from the anchor assembly 40. This pulling force causes the anchor assembly 40 to begin paying out the tether 30 (as indicated by the arrow near the anchor assembly 40 in FIG. 5). While the anchor assembly 40 is paying out the tether 30, the anchor assembly 40 also imposes a resistive force on the portion of the tether 30 extending between the helicopter 10 and the anchor assembly 40. This resistive force causes the imposition of a force on the aircraft 20 that counteracts the continued movement of the aircraft 20, thereby causing the aircraft 20 to decelerate and come to a stop hanging below the helicopter 10, as best shown in FIG. 6.

After the aircraft 20 is hanging below the helicopter 10, the helicopter 10 lowers the aircraft 20 into a docking fixture (not shown). The helicopter 10 may then depart to land or to execute other tasks.

In certain embodiments, a portion of the tether near the portion connected to the helicopter is elastic. In these embodiments, the elasticity of this elastic portion of the tether aids in maintaining tether tension without demanding excessive maneuvers of the helicopter.

In one embodiment, the tether includes a tension sensor that is configured to measure and transmit, to a helicopter control system, the tension at the upper end of the tether. This measured tension is used to aid in retrieval of the aircraft. For instance, in one embodiment, the position of the helicopter relative to the anchor assembly is regulated using this measured tension by (either automatically or via manual operator control) maneuvering the helicopter relative to the anchor assembly to maintain the designated tension in the tether during aircraft retrieval. In a related embodiment, the helicopter then descends and lowers the aircraft towards the docking fixture when the tether is pulled downward. In one embodiment, the helicopter control system is attached to the helicopter, while in another embodiment the helicopter control system is remote from the helicopter.

In certain embodiments, the aircraft retrieval system includes a navigation device configured to communicate to the helicopter control system the geographical location of the anchor assembly, which enables the helicopter to maintain its position above the anchor assembly. Specifically, in these embodiments, the geographical location of the anchor assembly is used to cause the helicopter to station-keep (either automatically or via manual operator control) along a substantially horizontal plane such that, during retrieval, the center-of-lift of the helicopter remains substantially aligned with the point at which the tether is connected to the anchor assembly. This device may employ a satellite-enabled Global Positioning System (GPS) or any other suitable system.

In certain embodiments, the helicopter carries a device configured to determine its position relative to the anchor assembly for purposes of enabling the helicopter to station-keep above the anchor assembly. Many options are known for this device, including methods based upon non-contacting optical, radio-frequency, magnetic, and thermal sensors. Mechanical sensors detecting the tether may also be used.

In certain embodiments, the anchor assembly is configured not to pay out the tether until the aircraft captures the tether. In various embodiments, the anchor assembly does so by including a breakaway link that is configured to: (1) prevent the anchor assembly from paying out the tether as long as the breakaway link remains unbroken; and (2) break when the tension in the lower portion of the tether at the anchor assembly exceeds a designated breaking tension. Thus, in these embodiments, the breakaway link prevents the anchor assembly from paying out the tether until the tension in the portion of the tether extending between the helicopter and the anchor assembly exceeds the designated breaking tension, at which point the breakaway link breaks and the anchor assembly can pay out the tether. In one such embodiment, the designated breaking tension is greater than a designated pre-retrieval tension in the portion of the tether extending between the helicopter and the anchor assembly prior to retrieval of the aircraft.

In certain embodiments, the anchor assembly includes a retracting device to which the tether is operably attached. The retracting device is configured to impose a designated retracting force on the portion of the tether extending between the helicopter and the anchor assembly. In these embodiments, the designated retracting force is less than or equal to the resistive force that the anchor assembly imposes upon payout of the portion of the tether extending between the helicopter and the anchor assembly. In these embodiments: (1) when a pulling force that exceeds the designated retracting force is imposed on the portion of the tether extending between the helicopter and the anchor assembly in a direction opposite that of the designated retracting force, the anchor assembly pays out the tether, and (2) when the pulling force is less than the designated retracting force, the retracting device retracts the tether. By this method, energy is dissipated from the swinging motion of the aircraft below the helicopter.

Retrieval of an Aircraft from Wing-Borne Flight Via Rendezvous with the Helicopter Returning to FIG. 1, in other embodiments, to retrieve the aircraft 200 from wing-borne flight, the helicopter 100 rendezvous with the aircraft 200 in flight and maneuvers such that the first mating device 170 of the first connector 120 of the helicopter 100 mates with and connects to the second mating device 270 of the second connector 220 of the aircraft 200 to link the helicopter 100 with the aircraft 200. The linked helicopter 100 and aircraft 200 then slow (such as by independently decreasing the speed of both the helicopter and the aircraft), and as the linked helicopter 100 and aircraft 200 gradually slow, the helicopter 100 gradually accepts the weight of the aircraft 200. The helicopter 100 then lowers the aircraft 200 to the landing area 50, which is not of sufficient size to enable the aircraft 200 to utilize the landing area 50 for take-off or landing (though it should be appreciated that the landing area may, in other embodiments, be of sufficient size to enable the aircraft to utilize the landing area for take-off or landing).

As the helicopter 100 lowers the aircraft 200 to the landing area, the lay lines 290 may be deployed. As the aircraft 200 nears the landing area 50, if the lay lines 290 are deployed, the ground crew and/or ground equipment may use the lay lines 290 to guide the aircraft 200 over and onto the landing area 50. The first and second mating devices 170 and 270 are then disconnected from each other (such as in any of the manners described above), breaking the linkage between the helicopter 100 and the aircraft 200 and enabling the helicopter to perform other activities.

In further embodiments, returning to FIG. 2, to retrieve the aircraft 1200 from wing-borne flight, the helicopter 1100 rendezvous with the aircraft 1200 in flight and maneuvers such that the mating device 1126 of the capture device 1124 mates with and connects to the portion of the aircraft 1200 to link the helicopter 1100 with the aircraft 1200. The linked helicopter 1100 and aircraft 1200 then slow (such as by independently decreasing the speed of both the helicopter and the aircraft), and as the linked helicopter 1100 and aircraft 1200 gradually slow, the helicopter 1100 gradually accepts the weight of the aircraft 1200. The helicopter 100 then lowers the aircraft 1200 to the landing area (not shown), which is not of sufficient size to enable the aircraft 1200 to utilize the landing area for take-off or landing (though it should be appreciated that the landing area may, in other embodiments, be of sufficient size to enable the aircraft to utilize the landing area for take-off or landing).

As the helicopter 1100 lowers the aircraft 1200 to the landing area, the lay lines 1290 and/or 1295 may be deployed. As the aircraft 1200 nears the landing area, if the lay lines 1290 and/or 1295 are deployed, the ground crew and/or ground equipment may use the lay lines 1290 and/or 1295 to guide the aircraft 1200 over and onto the landing area. The mating device 1126 is then disconnected from the aircraft 1200, breaking the linkage between the helicopter 1100 and the aircraft 1200 and enabling the helicopter 1120 to perform other activities.

Various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A helicopter-mediated method for retrieving an aircraft from wing-borne flight, said method comprising:
    flying a helicopter above an anchor assembly such that a first portion of a tether connected to both the helicopter and the anchor assembly extends between the helicopter and the anchor assembly;
    station-keeping the helicopter generally above the anchor assembly;
    measuring tension in the first portion of the tether and, when the measured tension in the first portion of the tether is not substantially equal to a designated tension, moving the helicopter relative to the anchor assembly until the measured tension in the first portion of the tether is substantially equal to the designated tension; and
    contacting and capturing a part of the first portion of the tether extending between the tether and the anchor assembly with the aircraft, thereby causing the anchor assembly to pay out a second portion of the tether and impose a resistive force opposing movement of the aircraft.

2. The method of claim 1, which includes station-keeping the helicopter generally above the anchor assembly before, during, and after the aircraft captures the part of the first portion of the tether.

3. The method of claim 1, which includes, after the aircraft captures the part of the first portion of the tether, lowering the helicopter to cause the aircraft to be received in a docking fixture.

4. The method of claim 1, which includes station-keeping the helicopter generally above the anchor assembly using a geographical location of the anchor assembly.

5. The method of claim 1, wherein moving the helicopter relative to the anchor assembly includes moving the helicopter substantially vertically.

6. The method of claim 1, which includes automatically station-keeping the helicopter.

7. The method of claim 1, which includes station-keeping the helicopter using manual control.

8. A helicopter-mediated system for retrieving an aircraft, said system comprising:
a helicopter including a first connector;
a tether connected to the helicopter via the first connector;
an anchor assembly connected to the tether such that a first portion of the tether extends between the helicopter and the anchor assembly,
a helicopter control system, and
a tension sensor configured to measure and to transmit, to the helicopter control system, a tension in the first portion of the tether extending between the helicopter and the anchor assembly,
wherein the anchor assembly is configured such that, when the tether is connected to the anchor assembly, imposition of an extending force on the tether in a direction away from the anchor assembly causes the anchor assembly to pay out a second portion of the tether and impose a resistive force opposing the extending force.

9. The system of claim 8, which includes a navigation device configured to determine a geographical location of the anchor assembly and to transmit the determined geographical location of the anchor assembly, and wherein the helicopter control system is one of: (a) attached to the helicopter, and (b) remote from the helicopter and is configured to receive the determined geographical location of the anchor assembly from the navigation device.

10. The system of claim 9, wherein the helicopter control system is configured to use the determined geographical location of the anchor assembly to cause the helicopter to station-keep generally above the anchor assembly.

11. The system of claim 8, wherein a portion of the first portion of the tether is elastic.

12. The system of claim 8, wherein the helicopter control system is configured to use the measured tension in the first portion of the tether to, when the measured tension in the first portion of the tether is not substantially equal to a designated tension, cause the helicopter to move relative to the anchor assembly until the measured tension in the first portion of the tether is substantially equal to the designated tension.

13. The system of claim 12, wherein said movement is substantially vertical.

14. The system of claim 8, wherein the anchor assembly includes a breakaway device configured to: (1) prevent the anchor assembly from paying out the second portion of the tether as long as a tension in the first portion of the tether extending between the helicopter and the anchor assembly does not exceed a designated tension, and (2) enable the anchor assembly to pay out the second portion of the tether when the tension in the first portion of the exceeds the designated tension.

15. The system of claim 8, wherein the anchor assembly includes a retracting device connected to the tether.

16. The system of claim 15, wherein the retracting device is configured to impose a designated retracting force on the first portion of the tether extending between the helicopter and the anchor assembly regardless of whether the extending force is imposed on the tether in the direction away from the anchor assembly.

17. The system of claim 16, wherein the extending force exceeds the designated retracting force.

18. The system of claim 8, wherein the first connector of the helicopter is connectable to a second connector of the aircraft to facilitate launch of the aircraft.

\* \* \* \* \*